United States Patent Office 3,290,351
Patented Dec. 6, 1966

3,290,351
ARYL ESTERS OF 3,4-DICHLORO-PHENYL THIONOCARBAMATES
Arthur F. McKay, Beaconsfield, Quebec, and David L. Garmaise, Montreal, Quebec, Canada, assignors to Monsanto Canada Limited, La Salle, Quebec, Canada
No Drawing. Filed July 30, 1963, Ser. No. 298,598
Claims priority, application Great Britain, Jan. 16, 1959, 1,773/59; June 10, 1959, 19,936/59
7 Claims. (Cl. 260—455)

This is a continuation-in-part of U.S. application Serial No. 30, filed January 4, 1960, now abandoned.

This invention relates to aryl esters of 3,4-dichlorophenyl thionocarbamates and 3,4-dichlorophenyl alkyl thionocarbamates and to the process of preparing these substances.

The compounds of the present invention have the general formula

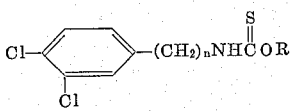

wherein R is selected from the group consisting of phenyl, and phenyl substituted with one of the group consisting of chlorine, bromine, fluorine, lower alkyl, lower alkoxy, and nitro radicals and $n$ is an integer from 0 to 3.

The thionocarbamates of the above general formula have been shown to be exceptionally potent bacteriostats. This structure has been found to be essential for the high bacteriostatic activities displayed by these compounds. Replacement of the aryl group represented by R by an aralkyl group gives compounds that are several hundred times less active. When the positions of the oxygen and sulfur compounds are reversed to give the corresponding thiolcarbamates, these thiolcarbamates are much less active as bacteriostats than the compounds of this invention. Similarly replacement of the remaining hydrogen of the nitrogen of the above general formula by an alkyl, aryl or an aralkyl group decreased the bacteriostatic activity of the compounds against gram positive organisms several hundredfold. Thus the unexpectedly high bacteriostatic activities possessed by the compounds of the present invention are associated with the specific structure represented by the above general formula.

The preferred compounds possess high bacteriostatic activities together with low toxicities towards mammals. Some of the other compounds such as 3,4-dichlorophenyl 3,4-dichlorobenzylthionocarbamate are highly potent bacteriostats, though they do possess high toxicity. Their applications will thus be limited to areas where high toxicity is not a factor such as the prevention of bacterial attack on surface coatings.

The compounds of the present invention are useful as industrial preservatives and as active substituents of ointments and salves for topical applications in the treatment of infected skin areas. Solutions of these materials in aqueous ethanol, isopropanol and water are useful disinfectants for walls, floors and furniture.

The compounds described may be prepared by reacting an inorganic salt, preferably the sodium salt, of a phenol selected from the group consisting of phenol and phenol substituted with chlorine, bromine, fluorine, lower alkyl, lower alkoxy, or nitro radicals with thiophosgene to form the corresponding substituted phenyl chlorothioformate. This process may be performed in a homogeneous inert medium, for example, benzene or chloroform, or alternatively, in a heterogeneous medium, for example, water and chloroform. The temperature range in which this reaction may be carried out is between 0° C. and 40° C., preferably about 30° C. The substituted chlorothioformate may be purified by fractional distillation under reduced pressure to separate it from the di-(substituted phenyl) thiocarbonate which appears as a minor by-product, but this purification is not essential to the success of the process. The chlorothioformate is then treated with two equivalents of 3,4-dichloroaniline, 3,4-dichlorobenzylamine, 3,4-dichlorophenylethylamine, or 3,4-dichlorophenylpropylamine in an inert solvent, for example, ether, benzene or chloroform at a temperature range of —190 C. to +20° C., preferably at the lower temperature. The precipitated amine hydrochloride may be removed by filtration, and the resulting substituted phenyl aryl- or aralkylthionocarbamate may then be recovered from the filtrate by fractional crystallization.

An alternative process, which is preferable in certain cases, comprises heating 3,4-dichlorobenzyl, 3,4-dichlorophenyl, 3,4-dichlorophenylethyl or 3,4-dichlorophenylpropyl isothiocyanate with a phenol, or a phenol substituted with chlorine, bromine, fluorine, lower alkyl, lower alkoxy, or nitro in the presence of a catalytic amount of a tertiary amine for example triethylamine of 1 to 5 mole percent, in a closed vessel, at a temperature between 25° C. and 150° C., preferably about 80° C. The reaction is allowed to proceed for a period of between 1 and 6 hours, preferably about 2 hours. The product may then be isolated by direct crystallization, or, alternatively, by extraction with a solvent immiscible with water, for example ether or benzene, followed by washing the solution with aqueous alkali, aqueous acid and water, and isolating the product by evaporation of the dried solution.

The following examples illustrate the invention but are not intended to limit the scope of the invention.

EXAMPLE 1

*Phenyl 3,4-dichlorobenzylthionocarbamate*

A solution of phenol (6.27 parts) in 5% aqueous sodium hydroxide solution (53 parts) was added dropwise with stirring to a solution of thiophosgene (7.7 parts) in chloroform (120 parts) at 30° C. The addition was completed in 15 minutes and the mixture was stirred for an additional 15 minutes at 30° C. The chloroform layer was separated and the aqueous layer was washed with chloroform (3×50 parts). The chloroform extracts (consisting essentially of a chloroform solution of phenyl chlorothioformate) were combined and dried over sodium sulfate.

A solution of 3,4-dichlorobenzylamine (23.42 parts) in chloroform (75 parts) was added dropwise with stirring to the solution of phenyl chlorothioformate in chloroform at —10° C. After the addition period of 30 minutes was complete, the cooling bath was removed and the temperature was allowed to rise to 30° C. The precipitated 3,4-dichlorobenzylamine hydrochloride was removed by filtration. Yield 13.3 parts (94%). The filtrate was evaporated under reduced pressure to one-third the original volume, and petroleum ether (75 parts) was added. The precipitated phenyl 3,4-dichlorobenzylthionocarbamate, M.P. 103–104° C., was recovered by filtration. Yield 17.22 parts (83%). The product was recrystallized from chloroform-petroleum ether to a melting point of 106–107° C.

*Analysis.*—Percent calculated for $C_{15}N_{12}Cl_3NOS$: C, 49.93; N, 3.36; Cl, 29.49; N, 3.88; S, 8.89. Found: C, 50.29; H, 2.34; Cl, 29.39; N, 3.64; S, 8.77.

EXAMPLE 2

*Phenyl 3,4-dichlorobenzylthionocarbamate*

A mixture of 3,4-dichlorobenzyl isothiocyanate (1.0 part), phenol (0.47 part), and triethylamine (0.011 part) was heated in a sealed tube at 80° C. for 2 hours. The reaction mixture was dissolved in ether (25 parts), and the ether solution was washed with 2% aqueous sodium hydroxide (10 parts) and with water (2×10 parts). Evaporation of the ether yielded the product, melting at 101–103° C. Yield 1.45 parts (100%). Trituration in petroleum ether (20 parts) yielded the pure product, M.P. 106–107° C. Yield 1.15 parts (78.3%). There was no depression of the melting point on admixture with a sample prepared according to the procedure outlined in Example 1.

EXAMPLE 3

*4-chlorophenyl 3,4-dichlorobenzylthionocarbamate*

4-chlorophenol was converted to 4-chlorophenyl chlorothioformate by the procedure outlined in Example 1. The chlorothioformate was added to 3,4-dichlorobenzylamine, as in Example 1, to give the product melting at 129–133° C. Yield 52%. Recrystallization from chloroform-petroleum ether raised the melting point to 135–136° C.

*Analysis.*—Percent calculated for $C_{14}H_{10}Cl_3NOS$: C, 48.51; H, 2.91; Cl, 30.68; N, 4.04; S, 9.25. Found: C, 48.49; H, 3.04; Cl, 30.53; N, 3.97; S, 9.17.

EXAMPLE 4

*4-methoxyphenyl 3,4-dichlorobenzylthionocarbamate*

4-methoxyphenol was converted to 4-methoxyphenyl chlorothioformate as described in Example 1. Condensation of the chlorothioformate with 3,4-dichlorobenzylamine gave the product melting at 102–104° C. Yield 75%. Recrystallization from chloroform-petroleum ether raised the melting point to 107–108° C.

*Analysis.*—Percent calculated for $C_{15}H_{13}Cl_2NOS$: C, 52.64; H, 3.83; Cl, 20.72; N, 4.09; S, 9.37. Found: C, 52.93; H, 4.07; Cl, 21.07; N, 4.09; S, 9.58.

EXAMPLE 5

*3,4 - dichlorophenyl 3,4 - dichlorobenzylthionocarbamate*

3,4-dichlorophenyl chlorothioformate (prepared from 3,4-dichlorophenol as described in Example 1) was treated with 3,4-dichlorobenzylamine to give the product melting at 94–95° C. Yield 19.7%. Recrystallization from chloroform-petroleum ether raised the melting point to 95–96° C.

*Analysis.*—Percent calculated for $C_{14}H_9Cl_4NOS$: C, 44.13; H, 2.38; Cl, 37.23; N, 3.68; S, 8.41. Found: C, 44.07; H, 2.56; Cl, 37.10; N, 3.70; S, 8.38.

EXAMPLE 6

*4-fluorophenyl 3,4-dichlorobenzylthionocarbamate*

3,4-dichlorobenzyl isothiocyanate was heated with 4-fluorophenol and triethylamine as described in Example 2. Crystallization of the reaction mixture with petroleum ether gave the product melting at 120–122° C. Yield 22.7%. The analytical sample melted at 123–124° C. after recrystallization from petroleum ether.

*Analysis.*—Percent calculated for $C_{14}H_{10}Cl_2FNOS$: C, 50.94; H, 3.05; Cl, 21.48; F, 5.76; N, 4.26; S, 9.71. Found: C, 50.95; H, 3.12; Cl, 21.26; F, 5.73; N, 4.34; S, 9.78.

EXAMPLE 7

*2-methylphenyl 3,4-dichlorobenzylthionocarbamate*

3,4-dichlorobenzyl isothiocyanate was treated with o-cresol and triethylamine as described in Example 2. Crystallization of the reaction mixture from chloroform-petroleum ether gave the product melting at 89–90° C. Yield 34.0%. Recrystallization from the same solvents did not affect the melting point.

*Analysis.*—Percent calculated for $C_{15}H_{13}Cl_2NOS$: C, 55.25; H, 4.02; Cl, 21.75; N, 4.29; S, 9.83. Found: C, 55.14; H, 4.21; Cl, 21.94; N, 4.32; S, 9.90.

EXAMPLE 8

*4-methylphenyl 3,4-dichlorophenylthionocarbamate*

4-methylphenyl chlorothioformate (prepared as described in Example 1) was treated with 3,4-dichloroaniline to give the product melting at 169–170° C. Yield 52%.

EXAMPLE 9

*4-methylphenyl 3,4-dichlorobenzylthionocarbamate*

3,4-dichlorobenzyl isothiocyanate was heated with p-cresol and triethylamine as described in Example 2. The reaction mixture was dissolved in ether and the ether solution was washed with 2% aqueous sodium hydroxide and with water. The ether solution was dried and evaporated and the residue was crystallized from petroleum ether, giving the product melting at 115–117° C. Yield 67.5%. Recrystallization from ether-petroleum ether raised the melting point to 118–119° C.

*Analysis.*—Percent calculated for $C_{15}H_{13}Cl_2NOS$: C, 55.25; H, 4.02; Cl, 21.75; N, 4.29; S, 9.83. Found: C, 55.08; H, 4.10; Cl, 21.60; N, 4.17; S, 9.75.

EXAMPLE 10

*4-ethylphenyl 3,4-dichlorobenzylthionocarbamate*

3,4-dichlorobenzyl isothiocyanate was heated with 4-ethylphenol and triethylamine as described in Example 2. Crystallization from petroleum ether gave the product melting at 96–97° C. Yield 58.8%. Recrystallization from petroleum ether raised the melting point to 97–98° C.

*Analysis.*—Percent calculated for $C_{16}H_{15}Cl_2NOS$: C, 56.48; H, 4.44; Cl, 20.84; N, 4.12; S, 9.42. Found: C, 56.54; H, 4.45; Cl, 20.84; N, 4.32; S, 9.41.

EXAMPLE 11

*4-n-propylphenyl 3,4-dichlorophenylthionocarbamate*

4-n-propylphenyl chlorothioformate (prepared as described in Example 1) was treated with 3,4-dichloroaniline to give the product melting at 159–161° C. Yield 74%.

EXAMPLE 12

*4-n-propylphenyl 3,4-dichlorobenzylthionocarbamate*

3,4-dichlorobenzyl isothiocyanate was heated with 4-n-propylphenol and triethylamine as described in Example 2. Crystallization from petroleum ether gave the product melting at 80–81° C. Yield 12.7%. Recrystallization from petroleum ether did not affect the melting point.

*Analysis.*—Percent calculated for $C_{17}H_{17}Cl_2NOS$: C, 57.64; H, 4.84; Cl, 20.02; N, 3.95; S, 9.05. Found: C, 57.88; H, 4.86; Cl, 20.01; N, 4.13; S, 8.86.

EXAMPLE 13

*4-n-hexylphenyl 3,4-dichlorobenzylthionocarbamate*

4-n-hexylphenyl chlorothioformate (prepared from 4-n-hexylphenol as described in Example 2) was treated with 3,4-dichlorobenzylamine to give the product melting at 87–88° C. Yield 49%.

*Analysis.*—Percent calculated for $C_{20}H_{13}Cl_2NOS$: C, 60.61; H, 5.85; Cl, 17.89; N, 3.53; S, 8.09. Found: C, 60.81; H, 6.24; Cl, 17.81; N, 3.62; S, 8.36.

EXAMPLE 14

*4-methoxyphenyl 3,4-dichlorophenylthionocarbamate*

4-methoxyphenyl chlorothioformate (prepared as described in Example 1) was treated with 3,4-dichloroaniline to give the product melting at 167–168° C. Yield 57%.

*Analysis.*—Percent calculated for $C_{14}H_{11}Cl_2NO_2S$: C, 51.24; H, 3.38; Cl, 21.61; N, 4.27; S, 9.76. Found: C, 50.97; H, 3.43; Cl, 21.61; N, 4.42; S, 9.62.

EXAMPLE 15

*4-n-butylphenyl 3,4-dichlorobenzylthionocarbamate*

4-n-butylphenyl chlorothioformate (prepared as described in Example 1) was treated with 3,4-dichlorobenzylamine to give the product melting at 79–83° C. Yield 41.7%. Recrystallization from petroleum ether raised the melting point to 90–91° C.

*Analysis.*—Percent calculated for $C_{18}H_{19}Cl_2NOS$: C, 58.70; H, 5.20; Cl, 19.25; N, 3.80; S, 8.75. Found: C, 58.53; H, 5.36; Cl, 19.35; N, 3.91; S, 8.69.

EXAMPLE 16

*4-ethoxyphenyl 3,4-dichlorobenzylthionocarbamate*

4-ethoxyphenyl chlorothioformate (prepared as described in Example 1) was heated with 3,4-dichlorobenzylamine to yield the product as a crystalline solid.

EXAMPLE 17

*4-ethoxyphenyl 3,4-dichlorophenylthionocarbamate*

4-ethoxyphenyl chlorothioformate (prepared as described in Example 1) was treated with 3,4-dichloroaniline to yield the product as a crystalline solid.

EXAMPLE 18

*3,4-dichlorophenyl 3,4-dichlorophenylthionocarbamate*

3,4-dichlorophenyl chlorothioformate (prepared as described in Example 1) was treated with 3,4-dichloroaniline to give the product melting at 142–143° C. Yield 72.2%.

*Analysis.*—Percent calculated for $C_{13}H_7Cl_4NOS$: C, 42.54; H, 1.92; Cl, 38.65; N, 3.82; S, 8.74. Found: C, 42.16; H, 2.02; Cl, 37.68; N, 4.23; S, 8.38.

EXAMPLE 19

*4-n-butylphenyl 3,4-dichlorophenylthionocarbamate*

4-n-butylphenylchlorothioformate (prepared as described in Example 1) was treated with 3,4-dichloroaniline to give the product melting at 120–123° C. Yield 48%. Recrystallization from petroleum ether raised the melting point to 125–126° C.

*Analysis.*—Percent calculated for $C_{17}H_{17}Cl_2NOS$: C, 57.63; H, 4.84; Cl, 20.01; N, 3.95; S, 9.05. Found: C, 57.39; H, 4.84; Cl, 20.13; N, 4.17; S, 9.18.

EXAMPLE 20

*Phenyl 3,4-dichlorophenylthionocarbamate*

Phenyl chlorothioformate (prepared as described in Example 1) was treated with 3,4-dichloroaniline to give the product melting at 151–156° C. Yield 44.4%. Recrystallization from chloroform raised the melting point to 156–157° C.

*Analysis.*—Percent calculated for $C_{13}H_9Cl_2NOS$: C, 52.36; H, 3.04; Cl, 23.78; N, 4.70; S, 10.75. Found: C, 52.37; H, 3.12; Cl, 24.19; N, 4.73; S, 10.82.

EXAMPLE 21

*Phenyl 2-(3,4-dichlorophenyl)-ethylthionocarbamate*

Phenyl chlorothioformate (prepared as described in Example 1) was treated with 2-(3,4-dichlorophenyl)-ethylamine to give the product melting at 84–85° C. Yield 81.4%. Recrystallization from ether-petroleum ether did not affect the melting point.

*Analysis.*—Percent calculated for $C_{15}H_{13}Cl_2NOS$: C, 55.22; H, 4.02; Cl, 21.74; N, 4.29; S, 9.83. Found: C, 55.13; H, 4.04; Cl, 21.71; N, 4.25; S, 9.78.

EXAMPLE 22

*4-ethylphenyl 3,4-dichlorophenylthionocarbamate*

4-ethylphenyl chlorothioformate (prepared as described in Example 1) was treated with 3,4-dichloroaniline to give the product melting at 158–160° C. Yield 52%. Recrystallization from chloroform-petroleum ether raised the melting point to 159–160° C.

*Analysis.*—Percent calculated for $C_{15}H_{13}Cl_2NOS$: C, 55.22; H, 4.02; Cl, 21.74; N, 4.29; S, 9.83. Found: C, 55.37; H, 4.13; Cl, 21.76; N, 4.34; S, 10.02.

EXAMPLE 23

*Phenyl 3-(3,4-dichlorophenyl) propylthionocarbamate*

Phenyl chlorothioformate (prepared as described in Example 1) was treated with 3-(3,4-dichlorophenyl) propylamine to give the product melting at 64–65° C. Yield 82%.

*Analysis.*—Percent calculated for $C_{16}H_{15}Cl_2NOS$: C, 56.48; H, 4.44; Cl, 20.84; N, 4.12; S, 9.42. Found: C, 56.79; H, 4.66; Cl, 20.62; N, 4.20; S, 9.15.

Utility of the compounds of this invention is disclosed with the results from comparative tests as given in the table below. The activity of the compounds presented in the table was determined by standard antibacterial tests made by halving dilutions on each compound, the initial dilution being $\frac{1}{10,000}$ with serial dilutions up to $\frac{1}{28,000,000}$. 0.1 millilitres of a $\frac{1}{10}$ dilution of an 8-hour old culture of the test organism was in each case added to incubation tubes containing the various concentrations of the test compounds and the tubes incubated for a period of twenty-four hours at 37° C. The tubes were then examined to determine the presence of growth of the organism. This examination was done visually and the presence of growth indicated by turbidity. The medium employed was "Difco" nutrient broth. In the table the compounds may be identified as follows:

(A) 4-ethylphenyl-3,4-dichlorophenylthionocarbamate.
(B) 4-ethylphenyl-3,4-dichlorobenzylthionocarbamate.
(C) 4-n-propylphenyl-3,4-dichlorophenylthionocarbamate.
(D) 4-methoxyphenyl-3,4-dichlorophenylthionocarbamate.
(E) 4-ethoxyphenyl-3,4-dichlorophenylthionocarbamate.
(F) 3,4-dichlorophenyl-3,4-dichlorobenzylthionocarbamate.
(G) 3-nitrophenyl-3,4-dichlorophenylthionocarbamate.
(H) Ethyl-phenyldithiocarbamate.
(I) Ethyl-3,4-dichlorophenylthionocarbamate.
(J) Ethyl-3,4-dichlorophenyldithiocarbamate.
(K) Phenyl-benzylthionocarbamate.
(L) Phenyl-β-phenylethylthionocarbamate.
(M) 4-chlorophenyl-4-chlorophenyldithiocarbamate.
(N) 4-chlorophenyl-3,4-dichlorophenylcarbamate.
(O) 3,4-dichlorophenyl-3,4-dichlorophenylcarbamate.
(P) 2,4-dichlorophenyl-2,4-dichlorophenylcarbamate.
(Q) 4-chlorobenzyl-3,4-dichlorobenzyldithiocarbamate.

The results in the table below show that compounds of this invention, A to G, had incomparably better antibacterial activity than had would be related compounds H to Q. From these results it will be noted that compounds of this invention constitute an effective class of bacteriostats.

MINIMUM INHIBITION CONCENTRATION $\frac{1}{\text{CONCENTRATION}} \times 10^{-3}$

| Compound | Staph. pyogenes (S) | Staph. pyogenes (R) | Sarcina lutea | Strept. faecalis | E. coli #198 | A. aerogenes | S. pullorum | Ps. aeruginosa | Pr. mirabilis | Pr. vulgaris |
|---|---|---|---|---|---|---|---|---|---|---|
| A | 20,480 | 10,240 | 10,240 | 640 | 640 | 40 | 80 | 10 | 160 | 320 |
| B | 20,480 | 20,480 | 10,240 | 10,240 | 320 | 20 | 10 | 10 | 20 | 20 |
| C | 8,000 | 8,000 | 8,000 | 2,560 | 10 | 10 | 10 | 10 | 10 | 10 |
| D | 128,000 | 16,000 | 8,000 | 8,000 | 40 | 10 | 10 | 10 | 20 | 20 |
| E | 16,000 | 16,000 | 16,000 | 4,000 | 10 | 10 | 10 | 10 | 10 | 10 |
| F | 10,240 | 5,120 | 5,120 | 2,560 | 1,280 | 40 | 40 | 20 | 640 | 640 |
| G | 32,000 | 64,000 | 2,560 | 1,280 | 20 | 10 | 10 | 10 | 20 | 20 |
| H | 20 | 20 | 40 | 20 | 10 | 10 | 10 | 10 | 10 | 10 |
| I | 80 | 20 | 10 | 80 | 10 | 20 | 20 | 10 | 10 | 10 |
| J | 80 | 80 | 80 | 80 | 20 | 10 | 20 | 10 | 20 | 20 |
| K | 320 | 320 | 320 | 80 | 160 | 20 | 10 | 20 | 160 | 160 |
| L | 40 | 40 | 40 | 20 | 10 | 10 | 20 | 10 | 10 | 10 |
| M | 2,560 | 1,280 | 640 | 20 | 20 | 20 | 40 | 10 | 10 | 10 |
| N | 80 | 80 | 40 | 10 | 10 | 10 | 20 | 10 | 160 | 160 |
| O | 1,280 | 1,280 | 1,280 | 1,280 | 10 | 160 | 160 | 10 | 20 | 10 |
| P | 20 | 10 | 20 | 20 | 10 | 10 | 10 | 10 | 10 | 20 |
| Q | 2,560 | 2,560 | 1,280 | 2,560 | 16 | 10 | 10 | 10 | 80 | 40 |

We claim:
1. Thionocarbamates having the formula

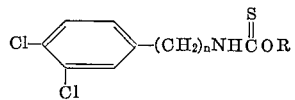

wherein R is a member of the group consisting of phenyl, chlorophenyl, bromophenyl, fluorophenyl, nitrophenyl, lower alkyl phenyl, lower alkoxy phenyl, and 3,4-dichlorophenyl and wherein $n$ is an integer from 0 to 1.

2. The compound phenyl 3,4-dichlorophenylthionocarbamate.

3. The compound 4-ethylphenyl 3,4-dichlorobenzylthionocarbamate.

4. The compound 4-ethylphenyl 3,4-dichlorophenylthionocarbamate.

5. The compound 4-n-butylphenyl 3,4-dichlorophenylthionocarbamate.

6. The compound 4-methoxyphenyl 3,4-dichlorophenylthionocarbamate.

7. The compound 3,4-dichlorophenyl 3,4-dichlorobenzylthionocarbamate.

References Cited by the Examiner

UNITED STATES PATENTS 2,060,733 10/1936 Hunt et al. _____ 260—455 X
2,225,124 12/1940 Martin _____ 260—455 X

FOREIGN PATENTS 760,432 10/1956 Great Britain.
1,067,425 10/1959 Germany.

OTHER REFERENCES

Browne et al.: Journal of Chemical Society, 1934, pp. 178–179, QD1C6.

Beaver et al.: Journal of American Chemical Society, 1957, vol. 79, pp. 1236 and 1244, QD1A5.

CHARLES B. PARKER, Primary Examiner.

D. R. MAHANAND, Assistant Examiner.